(12) United States Patent
Ryu et al.

(10) Patent No.: US 10,267,632 B2
(45) Date of Patent: Apr. 23, 2019

(54) NON-EXPOSURE SUPPLIED FUEL QUANTITY TESTING DEVICE AND METHOD OF VEHICLE-MOUNTED TYPE

(71) Applicant: Korea Petroleum Quality & Distribution Authority, Seongnam-si, Gyeonggi-do (KR)

(72) Inventors: Seung-Hyun Ryu, Yongin-si (KR); Jun-Deog Park, Yongin-si (KR); Young-Cheol Song, Ansan-si (KR); Ju Min Youn, Daejeon (KR); Seung Woo Lee, Uijeongbu-si (KR); Seung Heon Lee, Yongin-si (KR)

(73) Assignee: KOREA PETROLEUM QUALITY & DISTRIBUTION AUTHORITY, Seongnam-si (KR)

( * ) Notice: Subject to any disclaimer, the term of this patent is extended or adjusted under 35 U.S.C. 154(b) by 193 days.

(21) Appl. No.: 15/245,685

(22) Filed: Aug. 24, 2016

(65) Prior Publication Data
US 2017/0059382 A1 Mar. 2, 2017

(30) Foreign Application Priority Data
Aug. 26, 2015 (KR) .................. 10-2015-0120009

(51) Int. Cl.
*G01C 9/00* (2006.01)
*G01G 1/00* (2006.01)
*G01F 23/20* (2006.01)
*G07F 13/02* (2006.01)

(52) U.S. Cl.
CPC .................. *G01C 9/00* (2013.01); *G01G 1/00* (2013.01); *G07F 13/02* (2013.01); *G01F 23/20* (2013.01)

(58) Field of Classification Search
CPC ........... G01F 23/20; G07F 13/02; G01C 9/00; G01G 1/00
See application file for complete search history.

(56) References Cited

U.S. PATENT DOCUMENTS

| 5,927,142 | A | * | 7/1999 | Mercer | .................. G01F 23/20 73/296 |
| 2004/0079150 | A1 | * | 4/2004 | Breed | ..................... B60J 10/00 73/291 |

FOREIGN PATENT DOCUMENTS

| KR | 10-2003-0072539 | 9/2003 |
| KR | 20-2009-0008536 | 8/2009 |

(Continued)

OTHER PUBLICATIONS

English translation of IDS documents KR 20030072539, KR 100932012, and KR 20150057670.*

*Primary Examiner* — Justin Seo
*Assistant Examiner* — John M Royston
(74) *Attorney, Agent, or Firm* — Hauptman Ham, LLP

(57) ABSTRACT

Provided are non-exposure supplied fuel quantity testing device and method of a vehicle-mounted type, and more particularly, a device formed in a trunk of a vehicle without being exposed to test whether or not the ordered fuel quantity is supplied at the time of supplying fuel. Since the device is formed so as not to be exposed, it is disable to perform an artificial tampering of a lubricator, and since the device is mounted in the trunk, it is enable to measure whether or not the ordered fuel is supplied accurately at the same time as supplying fuel. The present invention relates to a testing method using the testing device.

9 Claims, 5 Drawing Sheets

(56) References Cited

FOREIGN PATENT DOCUMENTS

| KR | 10-0932012 | 12/2009 |
| KR | 10-2015-0057670 | 5/2015 |

* cited by examiner

【FIG. 1】
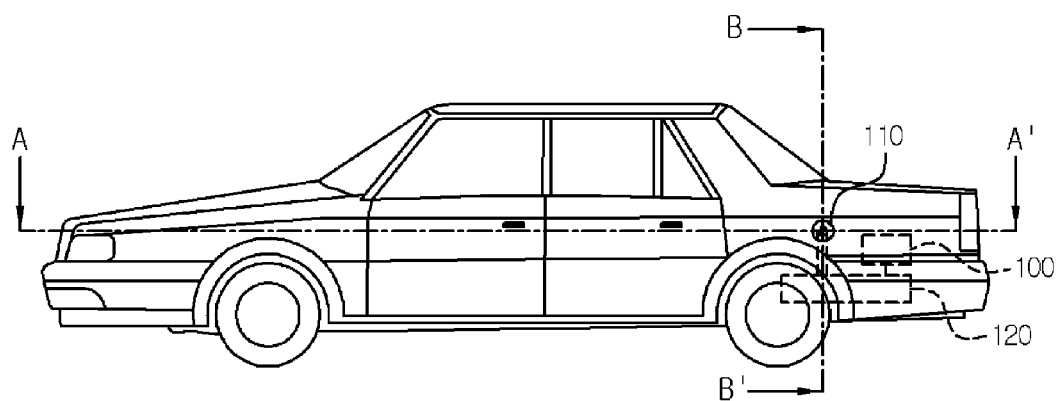
【FIG. 2】
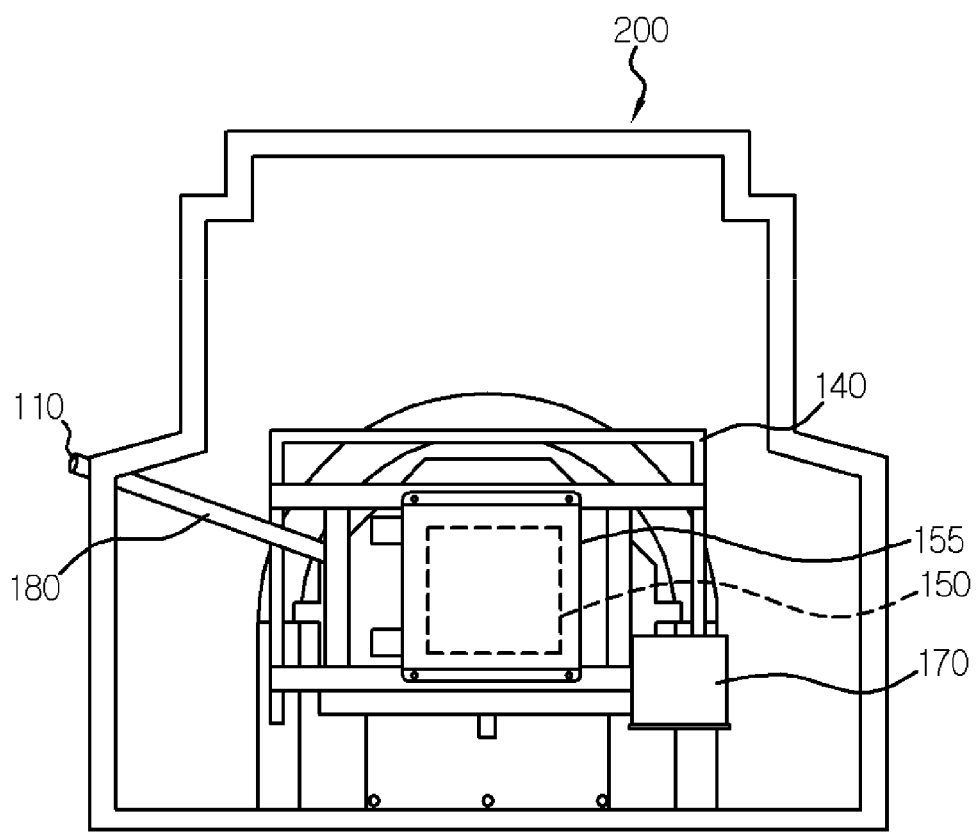

[FIG. 3]
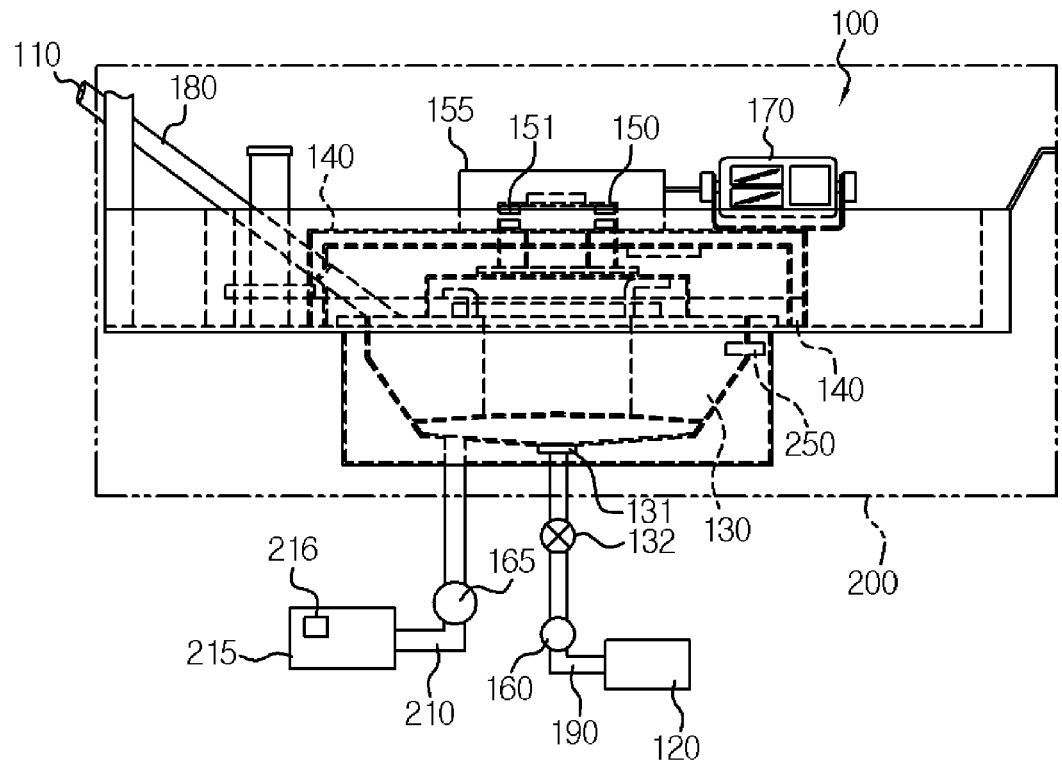
[FIG. 4]
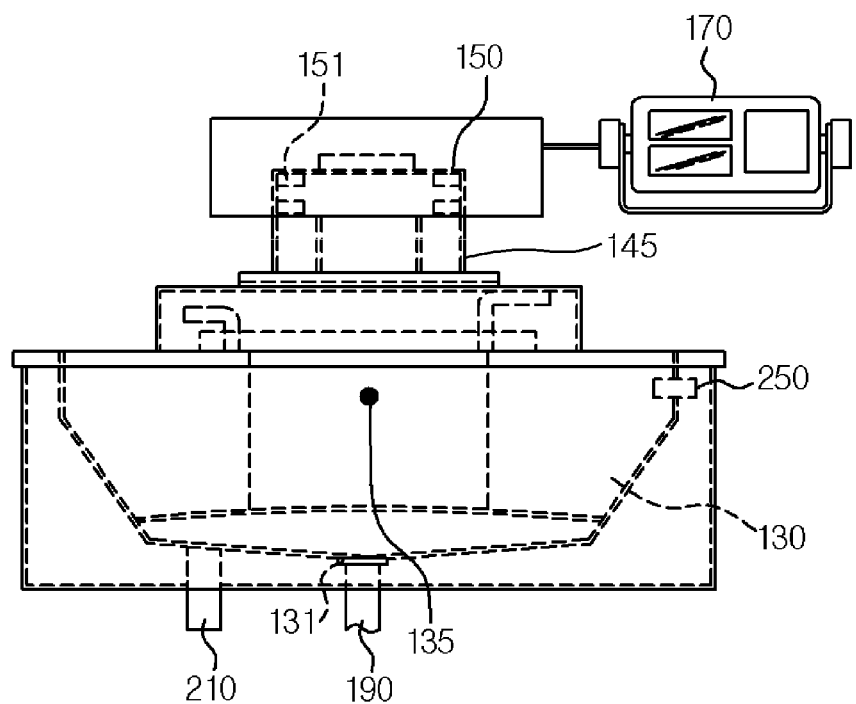

[FIG. 5]
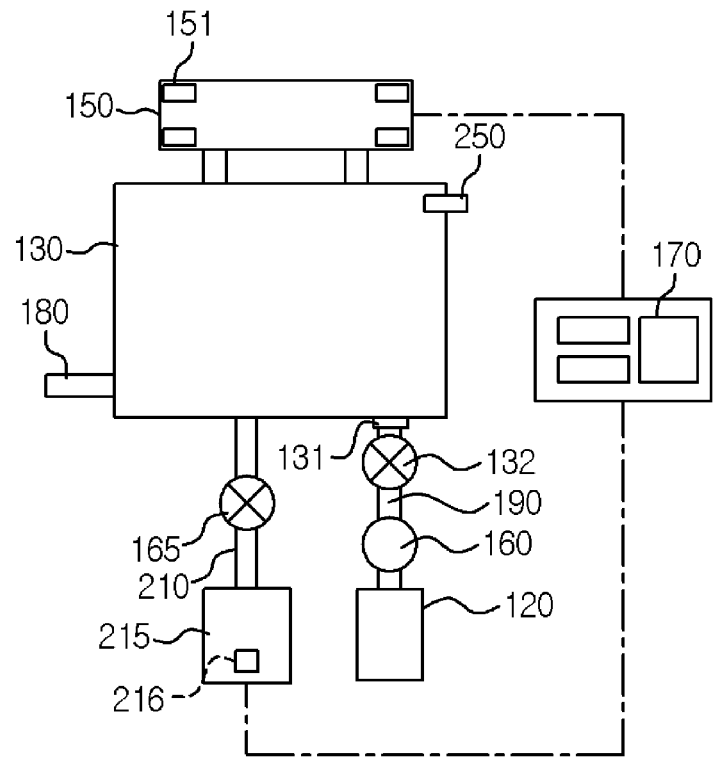
[FIG. 6]
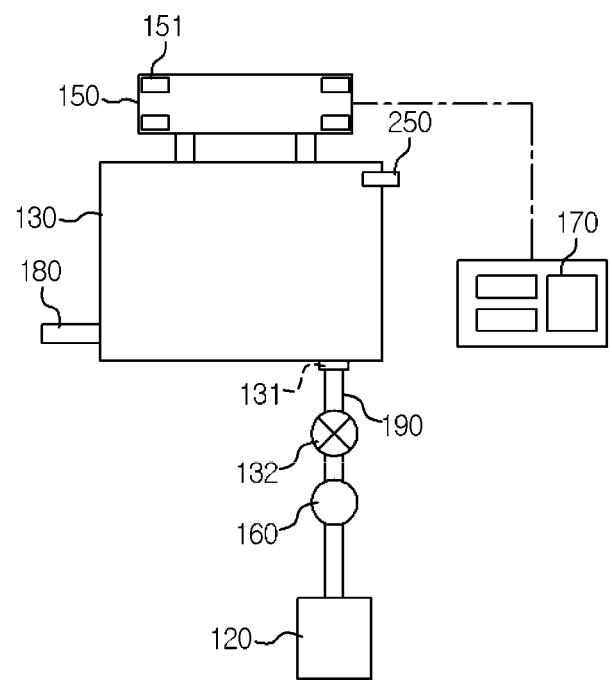

[FIG. 7]
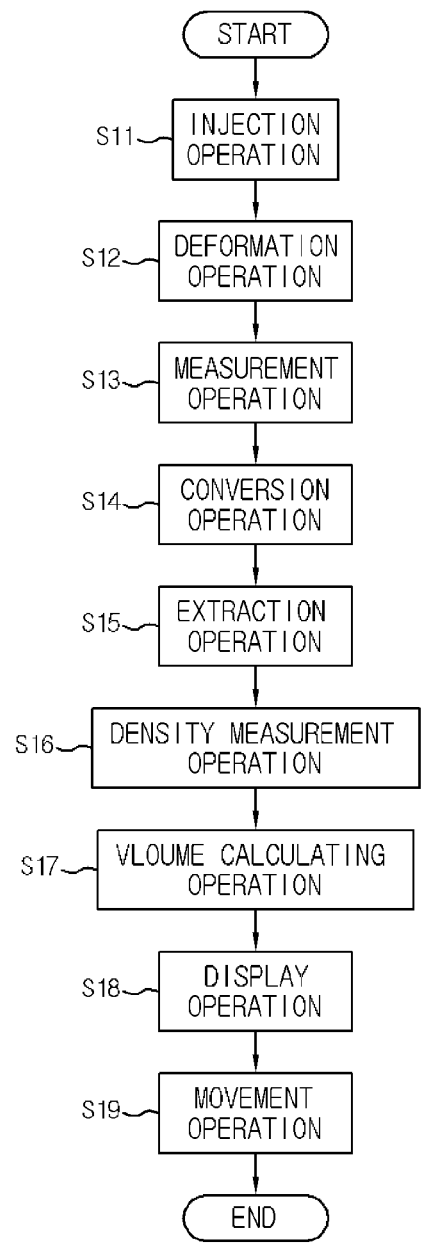

[FIG. 8]
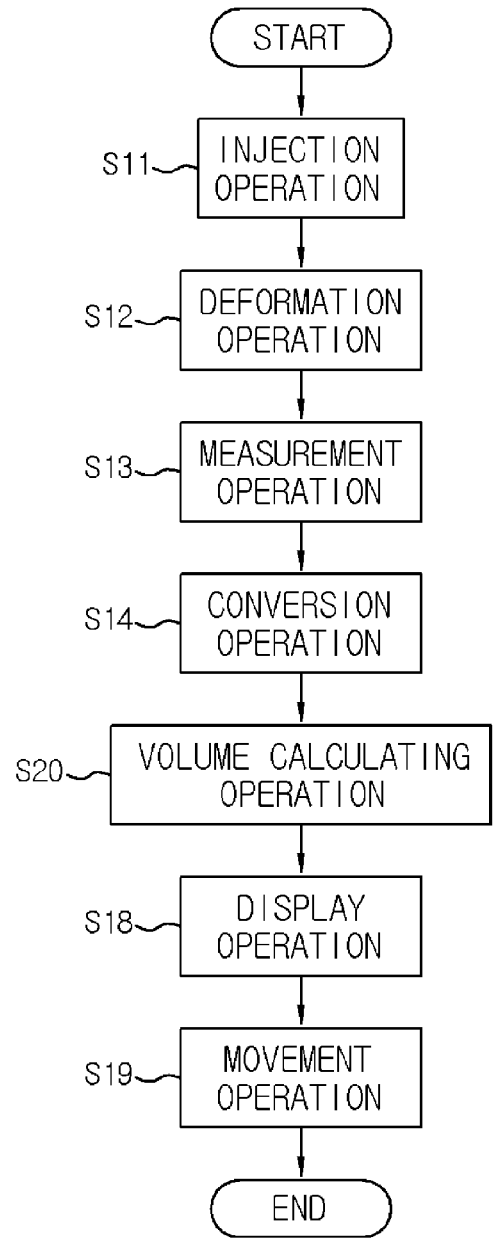

NON-EXPOSURE SUPPLIED FUEL QUANTITY TESTING DEVICE AND METHOD OF VEHICLE-MOUNTED TYPE

TECHNICAL FIELD

The present invention relates to non-exposure supplied fuel quantity testing device and method of a vehicle-mounted type, and more particularly, to an apparatus installed in a trunk of a vehicle without being exposed to thereby collect fuel without informing that a test is being performed and to easily test whether or not the ordered fuel quantity is supplied accurately.

BACKGROUND ART

Fuel (oil), which is an essential energy source widely used throughout a society for driving of a vehicle or heating, is supplied to the vehicle of a consumer through a petrol station.

However, in some petrol stations, many cases in which the ordered fuel is not supplied accurately by tampering a board of a flow meter of a lubricator or installing an illegal program, or the like in a main board to tamper the lubricator often occur.

Conventionally, as a method for confirming whether or not the fuel sold in the petrol station is accurately supplied, a standard tank was used. When a capacity testing using the standard tank is performed, the testing has been performed by expressing in advance that the capacity testing is performed and directly fueling the standard tank. Since the petrol station recognizing in advance the fact that the testing is performed tampers with the fuel quantity so as to supply the fuel accurately only at the time of the testing, there was a problem that it is difficult to essentially confirm whether or not the ordered fuel is accurately supplied.

RELATED ART DOCUMENT

Patent Document (Patent Document 1) Korean Patent No. 10-0932012 Korea Institute of Petroleum Management (entitled "Fuel Testing Apparatus and Method of Vehicle Mounted Type")

DISCLOSURE

Technical Problem

An object of the present invention is to provide a testing device mounted in a trunk of a vehicle so as not to be exposed, wherein a testing is performed at the same time as supplying fuel in a state in which a testing fact is not recognized. An object of the present invention is to provide a non-exposure supplied fuel quantity testing device of a vehicle-mounted type capable of rapidly determining whether or not the ordered fuel quantity is supplied accurately by disabling a petrol station to illegally perform an artificial lubricator tampering.

Further, an object of the present invention is to provide a non-exposure supplied fuel quantity testing method of a vehicle-mounted type capable of rapidly determining whether or not the ordered fuel quantity is supplied accurately at the same time as supplying fuel at a petrol station site, and significantly reducing consumer damage.

Technical Solution

In one general aspect, a supplied fuel quantity testing device 100 formed between an oil-hole 110 through which fuel is supplied and a fuel tank 120 in which the fuel is stored, and mounted in a trunk 200 of a vehicle comprises: a base frame 140 fixed to both ends within the trunk 200; a load cell 150 fixed to the base frame 140; a measurement tank 130 connected to the oil-hole 110 through a first fuel transfer line 180 and spaced apart from a lower end of the trunk 200, and positioned below the load cell 150; a connecting frame 145 positioned on a top of the measurement tank 130 and fixing the load cell 150 and the measurement tank 130 by connecting with each other to minimize influence by vibration and horizontality of the vehicle while measuring weight; a strain gauge 151 formed to be buried in the load cell 150 to measure an amount of deformation of the load cell 150; a density meter 216 measuring density of the fuel extracted from the measurement tank 130; and an indicator 170 calculating data using values measured by the strain gauge 151 and the density meter 216 and displaying the calculated data.

In another general aspect, when the density meter 216 is not included, a supplied fuel quantity testing device 100 formed between an oil-hole 110 through which fuel is supplied and a fuel tank 120 in which the fuel is stored, and mounted in a trunk 200 of a vehicle includes: a base frame 140 formed to be fixed to both ends within the trunk 200; a load cell 150 formed to be fixed to the base frame 140; a measurement tank 130 connected to the oil-hole 110 through a first fuel transfer line 180 and spaced apart from a lower end of the trunk 200, and positioned below the load cell 150; a connecting frame 145 positioned on a top of the measurement tank 130 and fixing the load cell 150 and the measurement tank 130 by connecting with each other to minimize influence by vibration and horizontality of the vehicle while measuring weight; a strain gauge 151 formed to be buried in the load cell 150 to measure an amount of deformation of the load cell 150; and an indicator 170 calculating data using a value measured by the strain gauge 151 and a preset density value and displaying the calculated data.

The indicator 170 may include a tilt sensor in the indicator 170 to confirm whether or not the load cell 150 is horizontal, and the measurement tank 130 may have the center of gravity positioned at a ⅓ point downwardly from the top of the measurement tank 130.

The measurement tank 130 may include a discharge part 131 for discharging fuel of which the measurement is completed, the discharge part 131 may discharge the fuel into the fuel tank 120 of the vehicle through a second fuel transfer line 190 including a 2-way valve 132 and a first fuel pump 160, and the measurement tank 130 may include a sampling extracting part 215, some of the fuel in the measurement tank 130 may be extracted into the sampling extracting part 215 through a third fuel transfer line 210 including a second fuel pump 165.

The load cell 150 may be coated with a protection film so as to be protected from interference and impact from the outside, and the first fuel transfer line 180 may be formed of an EPDM material, and the second fuel transfer line 190 and the third fuel transfer line 210 may be formed of a urethane material.

In another general aspect, a method for testing supplied fuel quantity using the supplied fuel quantity testing device comprises: an injection operation (S11) of injecting fuel into the measurement tank 130 through a first fuel transfer line 180 connected to the oil-hole 110; a deformation operation (S12) of deforming the load cell 150 as much as an amount of fuel injected into the measurement tank 130; a measurement operation (S13) of measuring a deformation rate of the load cell 150 by the strain gauge 151; a conversion operation (S14) of converting, by the indicator 170, a numerical value measured by the strain gauge 151 into a digital numerical value; an extraction operation (S15) of extracting the fuel in the measurement tank 130 into a sampling extracting part 215 through a third fuel transfer line 210; a density measurement operation (S16) of measuring density of the fuel in the sampling extracting part 215; a volume calculating operation (S17) of calculating a volume using a density value measured in the density measurement operation (S16) and a resulting value in the conversion operation (S14) by an operational program of the indicator 170; a display operation (S18) of displaying allowable error between a resulting value obtained by the volume calculating operation (S17) and the supplied fuel quantity, and an error rate by the operational program of the indicator 170; and a movement operation (S19) of moving the fuel of which the measurement is completed within the measurement tank 130 to the fuel tank 120 through a second fuel transfer line 190.

In another general aspect, when the density meter 216 is not included and a preset density value is used, a method for testing supplied fuel quantity using the supplied fuel quantity testing device comprises: an injection operation (S11) of injecting fuel into the measurement tank 130 through a first fuel transfer line 180 connected to the oil-hole 110; a deformation operation (S12) of deforming the load cell 150 as much as an amount of fuel injected into the measurement tank 130; a measurement operation (S13) of measuring a deformation rate of the load cell 150 by the strain gauge 15; a conversion operation (S14) of converting, by the indicator 170, a numerical value measured by the strain gauge 151 into a digital numerical value; a volume calculating operation (S20) of calculating a volume using a preset density value and a resulting value in the conversion operation (S14) by an operational program of the indicator 170; a display operation (S18) of displaying allowable error between a resulting value obtained by the volume calculating operation (S20) and the supplied fuel quantity, and an error rate by the operational program of the indicator 170; and a movement operation (S19) of moving the fuel of which the measurement is completed within the measurement tank 130 to the fuel tank 120 through a second fuel transfer line 190.

Advantageous Effects

According to the present invention, since the fuel testing device is mounted in the trunk of the vehicle, it is not exposed and the testing is performed at the same time as the supplying fuel, thereby making it possible to disable the petrol station to illegally perform the artificial tampering of the lubricator. Thereby, it is possible to easily determine whether or not the ordered fuel quantity is supplied accurately.

Further, according to the present invention, since it may be confirmed whether or not the ordered fuel quantity is supplied accurately at the same time as supplying fuel at the petrol station site, a testing time may be shortened, an illegal situation may be rapidly checked, and customer damage may be significantly reduced.

Further, according to the present invention, since the load cell is used, the quantity of the fuel is accurately measured, thereby making it possible to increase reliability of the testing.

DESCRIPTION OF DRAWINGS

FIG. 1 is a schematic view of a vehicle including a non-exposure supplied fuel quantity testing device of a vehicle-mounted type according to the present invention.

FIG. 2 is a cross-sectional view when looking down the non-exposure supplied fuel quantity testing device of a vehicle-mounted type according to the present invention.

FIG. 3 is a cross-sectional view illustrating the non-exposure supplied fuel quantity testing device of a vehicle-mounted type according to the present invention.

FIG. 4 is a cross-sectional view illustrating a portion within the non-exposure supplied fuel quantity testing device of a vehicle-mounted type according to the present invention.

FIG. 5 is a schematic view illustrating the non-exposure supplied fuel quantity testing device of a vehicle-mounted type according to the present invention.

FIG. 6 is a schematic view illustrating the non-exposure supplied fuel quantity testing device of a vehicle-mounted type in a case using a preset density value according to the present invention.

FIG. 7 is a flow chart illustrating a non-exposure supplied fuel quantity testing method of a vehicle-mounted type according to the present invention.

FIG. 8 is a flow chart illustrating the non-exposure supplied fuel quantity testing method of a vehicle-mounted type in a case using a preset density value according to the present invention.

BEST MODE

Hereinafter, a technical spirit of the present invention will be described in more detail with reference to the accompanying drawings. Beforehand, the terms and words used in the present specification and claims should not be interpreted as being limited to typical meanings or dictionary definitions, but should be interpreted as having meanings and concepts relevant to the technical scope of the present invention based on the rule that the inventor can appropriately define the concept of the terms in order to describe the invention in the best method. Therefore, configurations described in exemplary embodiments and shown in the drawings of the present specification are merely the most preferred example rather than indicating all the technical ideas of the present invention and therefore, it is to be understood that various equivalents and modifications that can replace the above configurations may be present.

The present invention relates to a non-exposure supplied fuel quantity testing device 100 and method of a vehicle-mounted type, and to a device mounted in a trunk 200 of a general vehicle so that a petrol station does not recognize in advance that the vehicle is a test vehicle, to confirm whether or not the supplied fuel quantity is less than the ordered fuel quantity after the test vehicle is refueled like a general consumer.

Hereinafter, a supplied fuel quantity testing device 100 and method of a vehicle-mounted type according to the present invention having the above-mentioned characteristics will be described in detail with reference to the accompanying drawings.

FIG. 1 is a schematic view of a vehicle including a non-exposure supplied fuel quantity testing device of a vehicle-mounted type according to the present invention, FIG. 2 is a cross-sectional view when looking down the non-exposure supplied fuel quantity testing device of a vehicle-mounted type according to the present invention, FIG. 3 is a cross-sectional view illustrating the non-exposure supplied fuel quantity testing device of a vehicle-mounted type according to the present invention, FIG. 4 is a cross-sectional view illustrating a portion within the non-exposure supplied fuel quantity testing device of a vehicle-mounted type according to the present invention, FIG. 5 is a schematic view illustrating the non-exposure supplied fuel quantity testing device of a vehicle-mounted type according to the present invention, FIG. 6 is a schematic view illustrating the non-exposure supplied fuel quantity testing device of a vehicle-mounted type in a case using a preset density value according to the present invention, FIG. 7 is a flow chart illustrating a non-exposure supplied fuel quantity testing method of a vehicle-mounted type according to the present invention, and FIG. 8 is a flow chart illustrating the non-exposure supplied fuel quantity testing method of a vehicle-mounted type in a case using a preset density value according to the present invention.

The supplied fuel quantity testing device 100 of a vehicle-mounted type according to the present invention, which is a device formed between an oil-hole 110 for injecting fuel (oil) into a vehicle and a fuel tank 120 in which the injected fuel (oil) is stored and measuring quantity of the fuel, comprises a base frame 140, a load cell 150, a measurement tank 130, and an indicator 170, as illustrated in FIG. 1.

As illustrated in FIG. 1, since the supplied fuel quantity testing device 100 is mounted in the trunk 200 of an existing vehicle, it is impossible to externally recognize that the vehicle mounting the testing device 100 is a vehicle for measuring supplied fuel quantity, thereby making it possible to easily test at a petrol station site whether or not the ordered fuel quantity is supplied accurately. Further, since the supplied fuel quantity testing device 100 is separately formed between the oil-hole 110 of the existing vehicle and the fuel tank 120, and the fuel is again transferred to the fuel tank 120 of the vehicle after performing the supplied fuel quantity measurement, the vehicle may be minimally reconstructed.

Since the base frame 140 is formed to be fixed at both ends within the trunk 200 of the vehicle, the load cell 150 is fixed stably to the base frame 140 and can bear a load. Further, the base frame 140 may be formed of a material such as rigid and stable iron, or the like.

In the case in which a flow meter or the number of revolution of a transfer pump is used in order to measure the supplied fuel quantity (a volume of the injected fuel), since a volume of the fuel of the vehicle is sensitively changed depending on a temperature, large error occurs at the time of measuring the supplied fuel quantity. In order to overcome the above-mentioned problem, the error may be relatively reduced by measuring weight and density.

The load cell 150 is fixed to the base frame 140. A measurement tank 130 is connected to the oil-hole 110 through a first fuel transfer line 180 and is spaced apart from a lower end of the trunk 200, and is positioned below the load cell 150. In order to minimize influence by vibration and horizontality of the vehicle while measuring weight, a connecting frame 145 is positioned on a top of the measurement tank 130 and fixed the load cell 150 and the measurement tank 130 by connecting with each other. Since the measurement tank 130 and the load cell 150 are integrally formed, it is possible to minimize influence by vertical and horizontal vibration, and horizontality of the vehicle, and interference of peripheral structure.

In general, a method for measuring weight in a hanging manner using the load cell 150 is greatly influenced by vibration when the load cell is mounted in the vehicle to be fixed thereto. That is, the hanging manner selecting a general load cell 150 uses the load cell 150 and the measurement tank 130 which are separated from each other, but according to the present invention, the load cell 150 and the measurement tank 130 are integrally formed to be formed as a complete single scale, thereby minimizing the influence by the vibration.

The load cell 150, which is a load (weight) measuring device, is deformed, for example, is compressed or stretched by the load. The measurement tank 130 formed at the lower end of the load cell 150 is connected to the oil-hole 110 through a first fuel transfer line 180. The fuel injected through the first fuel transfer line 180 from the oil-hole 110 is stored in the measurement tank 130. In this case, as weight of the measurement tank 130 storing the fuel is increased, the load cell 150 formed to be connected to an upper portion of the measurement tank is deformed.

As illustrated in FIG. 4, in order to minimize an influence by the vibration and horizontality of the load cell 150, the center of gravity of the measurement tank 130 is positioned at a ⅓ point downwardly from the top of the measurement tank 130, thereby minimizing an influence for a gradient according to a fuel injection. Since the load of fuel within the measurement tank 130 is directed to a center direction of the earth, there is an advantage that measurement error is small even though a horizontal difference between the vehicle and a ground occurs.

The measurement tank 130 includes an exhaust vent 250 formed at one side thereof. The exhaust vent 250 is formed to decrease internal pressure of the measurement tank 130, which is increased due to oil mist. That is, the oil mist within the measurement tank 130 is exhausted to the outside through the exhaust vent 250, thereby decreasing the internal pressure of the measurement tank 130.

The measurement tank 130 may further include a fixing member and a reinforcement member in addition to the base frame 140 in order to stably maintain horizontality thereof.

The load cell 150 includes a strain gauge 151. The strain gauge 151 is attached to measure an amount of deformation of the load cell 150 deformed due to the weight of the fuel within the measurement tank 130. The strain gauge 151 refers to a value indicating a length which is increased or decreased relative to an original length when tension or compression is applied to an object as a ratio, and measures a deformed state of the load cell 150.

As illustrated in FIG. 5 according to the present invention, the strain gauge 151 included in the load cell 150 is buried in the load cell 150 in an operation of manufacturing the load cell 150, that is, a buried-type strain gauge 151 is used.

A numerical value measured by the strain gauge 151 is an analog numerical value, which is converted into a digital numerical value to be indicated on the indicator 170. The indicator 170 is included to convert the analog numerical value of the strain gauge 151 into the digital numerical value, and the strain gauge 151 is connected to the indicator 170.

A tilt sensor for confirming whether or not the load cell 150 is horizontal is included to be embedded in the indicator 170. By the tilt sensor, it is possible to confirm whether or not the load cell 150 mounted to the base frame 140 is horizontal, and it is possible to prevent error which may be caused by a tilt during measuring a weight.

The digital numerical value converted by the indicator 170 is displayed on a display of a screen of the indicator 170. The indicator 170 includes a computer operational program of an inspector for convenience of the inspector, and the display may be further included in a driver's seat, a spare seat, and the like.

An operational program deducing a value displayed on the display of the indicator 170 will be simply described as follows. The operational program of the indicator 170 receives basic information on a testing date, an inspector, a petrol station, a lubricator, and confirms current weight in real time. Further, the operational program stores a value of weight measured after performing a primary measurement and a secondary measurement, calculates error and an error rate, and displays a diagram. Further, when a temperature and a density value of oil are input, the operational program calculates supplied fuel quantity and a measurement value. Further, the indicator 170 includes buttons having functions of CONNECT (a communication connection with the indicator, a device connection), DISCONNECT (disconnect the device connection), INPUT (input a density value), CALCULATE (measure weight and calculate a volume conversion), PRINT (store and export measured data DB), EXPORT (export result data in excel), DELETE (delete data selected by a data display), and SETTING (setting connection information of a device, a print port, and the like, an error rate, and the like), and has a display displaying measurement and calculation values deduced through the operational program of the indicator 170. Further, the indicator 170 may confirm data which is previously measured and may also export the data which is previously measured. Particularly, in the case of the density value, the indicator 170 may calculate the supplied fuel quantity using a value measured by a density meter 216, and may also calculate the supplied fuel quantity using a density value which is pre-input to the indicator.

As illustrated in FIG. 2, the load cell 150 may also be coated with a protection film 155 so as to be protected from interference and impact from the outside.

As illustrated in FIG. 3, the measurement tank 130 includes a discharge part 131 for discharging fuel of which the measurement is completed at a lower end thereof. The discharge part 131 may be preferably formed at the lower end of the measurement tank 130 to discharge the entirety quantity of the fuel. As illustrated in FIG. 4, the discharge part 131 is formed to be connected to a second fuel transfer line 190, and causes the fuel to flow through the second fuel transfer line 190. In this case, the second fuel transfer line 190 includes a two-way valve 132 and a first fuel pump 160, and is connected to the fuel tank 120 within the vehicle.

As illustrated in FIG. 5, a third fuel transfer line 210 connected to the measurement tank 130 includes a second fuel pump 165, and is connected to a sampling extracting part 215 for collecting a small amount of fuel. Suitability of the injected fuel may be tested by performing a component analysis of the fuel collected from the sampling extracting part 215. Since the sampling extracting part 215 includes a density meter 216, the density meter 216 measures the density value of the fuel extracted into the sampling extracting part 215 and then transmits a measurement value to the indicator 170.

As illustrated in FIG. 6, in the case in which the density meter 216 is not included, the supplied fuel quantity is calculated using a density value which is pre-input to the indicator 170.

The first fuel transfer line 180 is formed of an ethylene propylene diene monomer (EPDM) material. Since the first fuel transfer line 180 has a large pipe diameter, it may cause a number of errors due to large interference at the time of measuring the weight. Therefore, in order to reduce the error, EPDM is used. The EPDM is a material which is widely used for a wire, an electrical component, a hose, a cover material, and the like, and is particularly a material used as the hose covering the connection line or the like of the fuel tank of an LPG vehicle. The EPDM has excellent chemical resistance against chemicals and strong durability against a temperature and moisture, thereby making it possible to reduce error in a fuel weight measurement by the fuel transfer line. Further, the second fuel transfer line 190 and the third fuel transfer line 210 are formed of a urethane material.

A supplied fuel quantity testing method of a vehicle-mounted type illustrated in FIG. 7 comprises an injection operation (S11), a deformation operation (S12), a measurement operation (S13), a conversion operation (S14), an extraction operation (S15), a density measurement operation (S16), a volume exchange operation (S17), a display operation (S18), and a movement operation (S19).

In the injection operation (S11), fuel of a petrol station to be measured is injected through the oil-hole 110 in a state in which it is not exposed. In this case, the fuel injected through the oil-hole 110 flows along the first fuel transfer line 180 and is stored in the measurement tank 130.

In the deformation operation (S12), the load cell 150 is deformed according to an amount of fuel stored in the measurement tank 130. In this case, the measurement tank 130 is integrally formed at a lower portion of the load cell 150, to thereby pull the load cell 150 in a gravity direction.

In the measurement operation (S13), the strain gauge 151 measures a deformation rate of the load cell 150 deformed due to the measurement tank 130.

In the conversion operation (S14), a numerical value measured by the strain gauge 151 is transmitted to the indicator 170 and is converted into a digital numerical value by the indicator 170. The digital numerical value, which is converted to be displayed on the display of the indicator 170, is finally displayed by the operational program of the indicator 170 together with a value obtained through the volume calculating operation (S17) to be described below.

In the extraction operation (S15), a sample fuel is extracted, and the fuel is moved along the third fuel transfer line 210 and the second fuel pump 165 is activated simultaneously. The sample fuel moved along the third fuel transfer line 210 is extracted into the sampling extracting part 215. The density measurement operation (S16) of measuring density of the fuel is performed using the density meter 216 included in the sampling extracting part 215. After the volume calculating operation (S17) of calculating a volume using a density value measured by the density meter 216 in the sampling extracting part 215 and a resulting value in the conversion operation (S14), the display operation (S18) of displaying allowable error between a resulting value obtained by the volume calculating operation (S17) and supplied fuel quantity, and an error rate by the operational program of the indicator 170 is performed.

The movement operation (S19) in which the fuel within the measurement tank 130 is moved to the second fuel transfer line 190 through the discharge part 131 and is moved to the fuel tank 120 along the second fuel transfer line 190 is performed.

A supplied fuel quantity testing method of a vehicle-mounted type illustrated in FIG. 8 corresponds to a case using a preset density value because the density meter 216 is not included, and includes an injection operation (S11), a deformation operation (S12), a measurement operation (S13), a conversion operation (S14), a volume calculating operation (S20), a display operation (S18), and a movement operation (S19). Here, the injection operation (S11), the deformation operation (S12), the measurement operation (S13), the conversion operation (S14), the display operation (S18), and the movement operation (S19) are the same as those described in FIG. 7, and the volume calculating operation (S20) refers to an operation of calculating a volume using the preset density value and the resulting value from the conversion operation (S14) by the operational program of the indicator 170.

In the supplied fuel quantity testing device 100 and method of a vehicle-mounted type according to the present invention, since the testing device 100 is mounted in the trunk 200 of the vehicle to perform the testing at the same time as supplying fuel, it is disable to illegally perform an artificial tampering of a lubricator, thereby making it possible to easily determine quantification of the fuel. Further, since the load cell 150 formed integrally with the measurement tank 130 is used, the error at the time of measurement caused by external interference may be reduced, and since the first fuel transfer line formed of the EPDM is used, error of the fuel itself may be reduced. Further, a testing time may be shortened, an illegal situation may be rapidly checked, and customer damage may be significantly reduced.

The present invention is not limited to the above-mentioned exemplary embodiments, and may be variously applied, and may be variously modified without departing from the scope of the present invention claimed in the claims.

[Detailed Description of Main Elements]

100: supplied fuel quantity testing device
200: trunk
110: oil-hole
120: fuel tank
130: measurement tank
131: discharge part
132: 2-way valve
135: center of gravity
140: base frame
145: connecting frame
150: load cell
151: strain gauge
155: protection film
160: first fuel pump
165 second fuel pump
170: indicator
180: first fuel transfer line
190: second fuel transfer line
210: third fuel transfer line
215: sampling extracting part
216: density meter
250: exhaust vent
S11 to S20: respective operations of the supplied fuel quantity testing method using the supplied fuel quantity testing device

The invention claimed is:

1. A supplied fuel quantity testing device 100 formed between an oil-hole 110 through which fuel is supplied and a fuel tank 120 in which the fuel is stored, and mounted in a trunk 200 of a vehicle, comprising:
a base frame 140 fixed at both ends within the trunk 200;
a single load cell 150 fixed to the base frame 140;
a measurement tank 130 connected to the oil-hole 110 through a first fuel transfer line 180 and spaced apart from a lower end of the trunk 200 and positioned below the single load cell 150;
a connecting frame 145 positioned on a top of the measurement tank 130 and fixing the single load cell 150 and the measurement tank 130 by connecting with each other to minimize influence by vibration and horizontality of the vehicle while measuring weight;
a strain gauge 151 formed to be buried in the single load cell 150 to measure an amount of deformation of the single load cell 150;
a density meter 216 measuring density of the fuel extracted from the measurement tank 130; and
an indicator 170 calculating data using values measured by the strain gauge 151 and the density meter 216, and displaying the calculated data,
wherein the indicator 170 further comprises a tilt sensor in the indicator 170 to confirm whether or not the single load cell 150 is horizontal.

2. The supplied fuel quantity testing device 100 of claim 1, wherein the measurement tank 130 has the center of gravity positioned at a ⅓ point downwardly from the top of the measurement tank 130.

3. The supplied fuel quantity testing device 100 of claim 1, further comprising:
a discharge part 131 formed at a lower end of the measurement tank 130 to discharge the fuel;
a 2-way valve 132 connected to the discharge part 131 to block a transfer of the fuel;
a first fuel pump 160 connected to the 2-way valve 132 to inhale the fuel stored in the measurement tank 130; and
a second fuel transfer line 190 transferring the fuel inhaled by the first fuel pump to the fuel tank 120.

4. The supplied fuel quantity testing device 100 of claim 3, further comprising:
a second fuel pump 165 inhaling the fuel stored in the measurement tank 130;
a third fuel transfer line 210 transferring the fuel inhaled by the second fuel pump; and
a sampling extracting part 215 extracting the fuel transferred by the third fuel transfer line 210, wherein the density meter 216 is included in the sampling extracting part 215 to measure density of the fuel extracted into the sampling extracting part 215.

5. The supplied fuel quantity testing device 100 of claim 1, wherein the single load cell 150 is coated with a protection film 155 so as to be protected from interference and impact from the outside.

6. A supplied fuel quantity testing device 100 formed between an oil-hole 110 through which fuel is supplied and a fuel tank 120 in which the fuel is stored, and mounted in a trunk 200 of a vehicle, comprising:
a base frame 140 fixed to both ends within the trunk 200;
a single load cell 150 fixed to the base frame 140;
a measurement tank 130 connected to the oil-hole 110 through a first fuel transfer line 180 and spaced apart from a lower end of the trunk 200, and positioned below the single load cell 150;
a connecting frame 145 positioned on a top of the measurement tank 130 and fixing the single load cell 150 and the measurement tank 130 by connecting with each other to minimize influence by vibration and horizontality of the vehicle while measuring weight;
a strain gauge 151 formed to be buried in the single load cell 150 to measure an amount of deformation of the single load cell 150; and
an indicator 170 calculating data using values measured by the strain gauge 151 and a preset density value, and displaying the calculated data,
wherein the indicator 170 further comprises a tilt sensor in the indicator 170 to confirm whether or not the single load cell 150 is horizontal.

7. The supplied fuel quantity testing device 100 of claim 6, further comprising:
a discharge part 131 formed at a lower end of the measurement tank 130 to discharge the fuel;
a 2-way valve 132 connected to the discharge part 131 to block a transfer of the fuel;
a first fuel pump 160 connected to the 2-way valve 132 to inhale the fuel stored in the measurement tank 130; and
a second fuel transfer line 190 transferring the fuel inhaled by the first fuel pump to the fuel tank 120.

8. A method for testing supplied fuel quantity using a supplied fuel quantity testing device formed between an oil-hole 110 through which fuel is supplied and a fuel tank 120 in which the fuel is stored, and mounted in a trunk 200 of a vehicle, the supplied fuel quantity testing device comprising: a base frame 140 fixed to both ends within the trunk 200; a single load cell 150 fixed to the base frame 140; a measurement tank 130 connected to the oil-hole 110 through a first fuel transfer line 180 and spaced apart from a lower end of the trunk 200 and positioned below the single load cell 150; a connecting frame 145 positioned on a top of the measurement tank 130 and fixing the single load cell 150 and the measurement tank 130 by connecting with each other to minimize influence by vibration and horizontality of the vehicle while measuring weight; a strain gauge 151 formed to be buried in the single load cell 150 to measure an amount of deformation of the single load cell 150; a density meter 216 measuring density of the fuel extracted from the measurement tank 130; an indicator 170 calculating data using values measured by the strain gauge 151 and the density meter 216, and displaying the calculated data; a discharge part 131 formed at a lower end of the measurement tank 130 to discharge the fuel; a 2-way valve 132 connected to the discharge part 131 to block a transfer of the fuel; a first fuel pump 160 connected to the 2-way valve 132 to inhale the fuel stored in the measurement tank 130; and a second fuel transfer line 190 transferring the fuel inhaled by the first fuel pump to the fuel tank 120, wherein the indicator 170 further comprises a tilt sensor in the indicator 170 to confirm whether or not the single load cell 150 is horizontal, the method comprising:

- an injection operation (S11) of injecting fuel into the measurement tank 130 through a first fuel transfer line 180 connected to the oil-hole 110;
- a deformation operation (S12) of deforming the single load cell 150 as much as an amount of fuel injected into the measurement tank 130;
- a measurement operation (S13) of measuring a deformation rate of the single load cell 150 by the strain gauge 151;
- a conversion operation (S14) of converting, by the indicator 170, a numerical value measured by the strain gauge 151 into a digital numerical value;
- an extraction operation (S15) of extracting the fuel in the measurement tank 130 into a sampling extracting part 215 through a third fuel transfer line 210;
- a density measurement operation (S16) of measuring density of the fuel in the sampling extracting part 215;
- a volume calculating operation (S17) of calculating a volume using a density value measured in the density measurement operation (S16) and a resulting value in the conversion operation (S14) by an operational program of the indicator 170;
- a display operation (S18) of displaying allowable error between a resulting value obtained by the volume calculating operation (S17) and the supplied fuel quantity, and an error rate by the operational program of the indicator 170; and
- a movement operation (S19) of moving the fuel of which the measurement is completed within the measurement tank 130 to the fuel tank 120 through a second fuel transfer line 190.

9. A method for testing supplied fuel quantity using a supplied fuel quantity testing device formed between an oil-hole 110 through which fuel is supplied and a fuel tank 120 in which the fuel is stored, and mounted in a trunk 200 of a vehicle, comprising:

- a base frame 140 fixed to both ends within the trunk 200;
- a single load cell 150 fixed to the base frame 140;
- a measurement tank 130 connected to the oil-hole 110 through a first fuel transfer line 180 and spaced apart from a lower end of the trunk 200, and positioned below the single load cell 150;
- a connecting frame 145 positioned on a top of the measurement tank 130 and fixing the single load cell 150 and the measurement tank 130 by connecting with each other to minimize influence by vibration and horizontality of the vehicle while measuring weight;
- a strain gauge 151 formed to be buried in the single load cell 150 to measure an amount of deformation of the single load cell 150;
- an indicator 170 calculating data using values measured by the strain gauge 151 and a preset density value, and displaying the calculated data;
- a discharge part 131 formed at a lower end of the measurement tank 130 to discharge the fuel;
- a 2-way valve 132 connected to the discharge part 131 to block a transfer of the fuel;
- a first fuel pump 160 connected to the 2-way valve 132 to inhale the fuel stored in the measurement tank 130; and
- a second fuel transfer line 190 transferring the fuel inhaled by the first fuel pump to the fuel tank 120, wherein the indicator 170 further comprises a tilt sensor in the indicator 170 to confirm whether or not the single load cell 150 is horizontal, the method comprising:

an injection operation (S11) of injecting fuel into the measurement tank 130 through the first fuel transfer line 180 connected to the oil-hole 110;

a deformation operation (S12) of deforming the single load cell 150 as much as an amount of fuel injected into the measurement tank 130;

a measurement operation (S13) of measuring a deformation rate of the single load cell 150 by the strain gauge 151;

a conversion operation (S14) of converting, by the indicator 170, a numerical value measured by the strain gauge 151 into a digital numerical value;

a volume calculating operation (S20) of calculating a volume using the preset density value and a resulting value in the conversion operation (S14) by an operational program of the indicator 170;

a display operation (S18) of displaying allowable error between a resulting value obtained by the volume calculating operation (S20) and the supplied fuel quantity, and an error rate by the operational program of the indicator 170; and a movement operation (S19) of moving the fuel of which the measurement is completed within the measurement tank 130 to the fuel tank 120 through a second fuel transfer line 190.

* * * * *